United States Patent [19]

Yoshitake et al.

[11] Patent Number: 4,930,694
[45] Date of Patent: Jun. 5, 1990

[54] DEVICE MOUNTING APPLIANCE

[75] Inventors: Kunitoshi Yoshitake; Yoshihiro Tsujita; Nobuyuki Kakuta, all of Hyogo, Japan

[73] Assignee: Mitsubishi Denki Kabushiki Kaisha, Tokyo, Japan

[21] Appl. No.: 365,303

[22] Filed: Jun. 13, 1989

[30] Foreign Application Priority Data

Jun. 14, 1988 [JP] Japan .................. 63-147731

[51] Int. Cl.$^5$ ............................................. B60R 11/00
[52] U.S. Cl. ........................... 224/42.45 R; 248/222.1
[58] Field of Search ............. 224/42.45 R, 42.46 R, 224/42.41; 248/221.3, 222.1, 223.4

[56] References Cited

U.S. PATENT DOCUMENTS

| 4,047,686 | 9/1977 | Porter | 224/42.45 R |
| 4,113,217 | 9/1978 | O'Connell | 248/221.3 |
| 4,368,866 | 1/1983 | Urban | 224/42.45 R |

FOREIGN PATENT DOCUMENTS 60-12798  4/1985  Japan .
61-36427  10/1986 Japan .
62-16110  4/1987  Japan .

Primary Examiner—Linda J. Sholl

[57] ABSTRACT

A device mounting appliance comprising a device and a mounting appliance, the device mounting appliance including at least three combined leg-lugs formed on a mounting surface of the device; recesses formed in the combined leg-lugs, respectively; a fixing lug formed on the mounting surface of the device so as to be positioned within a polygon formed by connecting the combined leg-lugs; a movable lever attached to the mounting appliance, the lever having a hook portion and a wobbling preventing projection and being urged in one direction by a spring; and a guide provided on the mounting appliance and engaged with lugs of the appliance which are fitted into the recesses of the combined leg-lugs when the device on the mounting appliance is slid a predetermined distance, and also engaged with the combined leg-lugs upon such sliding of the device, wherein when the device on the mounting appliance is slid, the lever is once moved by the fixing lug of the device against the spring and then, at the end of the sliding motion, it is returned by the spring, allowing the hook portion to grip the fixing lug substantially in the sliding direction, and at the same time, the wobbling preventing projection of the lever is brought into pressure contact with the fixing lug, whereby the device can be easily fixed firmly to the mounting appliance without wobbling and can be easily detached therefrom.

4 Claims, 7 Drawing Sheets

FIG. 1
(PRIOR ART)
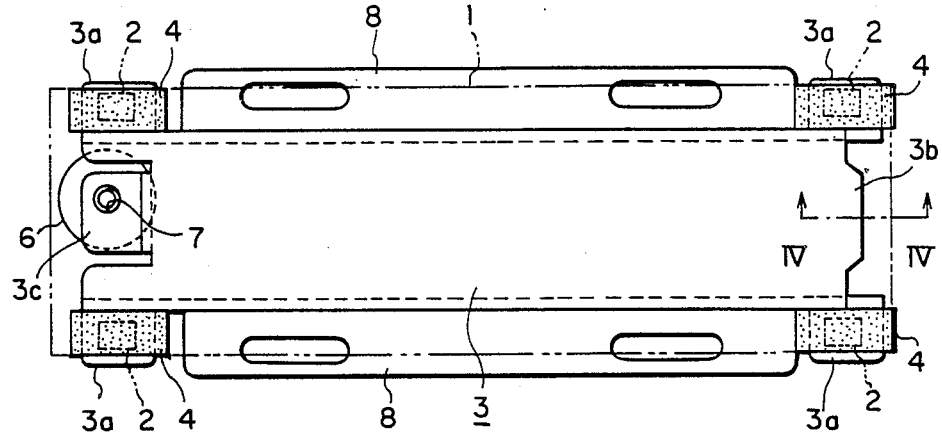
FIG. 2
(PRIOR ART)
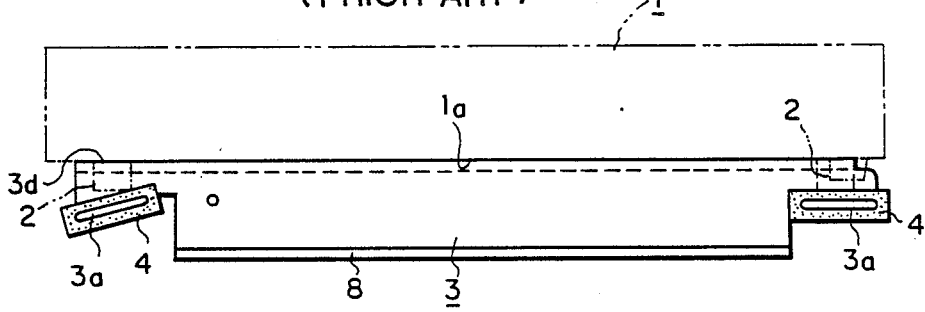
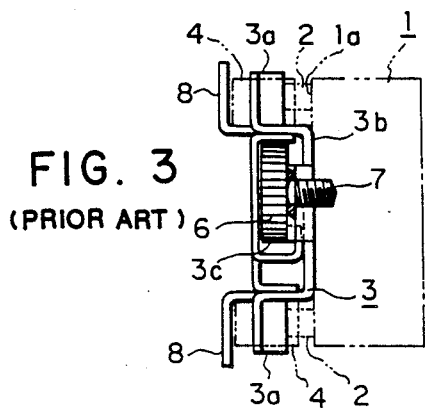
FIG. 3
(PRIOR ART)
FIG. 4
(PRIOR ART)
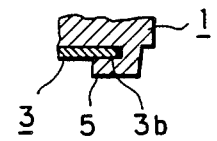

DEVICE MOUNTING APPLIANCE

BACKGROUND OF THE INVENTION

1. Field of the Invention

The present invention relates to a device mounting appliance for removably fixing a portable device to an automobile or the like.

2. Description of the Prior Art

A conventional device mounting appliance will now be explained with reference to FIGS. 1 to 4. FIGS. 1 to 3 are a plan view, a front view and a side view, respectively, of the appliance, and FIG. 4 is a sectional view taken on line IV—IV of FIG. 1. In these figures, the reference numeral 1 denotes a portable device. The portable device 1 has a mounting surface 1a on which four legs 2 are formed. These legs 2 function as device protecting legs when the device is placed on a table or the like. The numeral 3 denotes a mounting appliance for fixing the device 1 to an automobile or the like. The appliance 3 has four raised pieces 3a. A rubber seat 4 is fitted on each raised piece 3a, and the rubber seats 4 are located in positions next to the legs 2. Numeral 5 denotes a hook formed at one end of the device 1, the hook 5 being fitted on one end 3b of the mounting appliance 3. Numeral 6 denotes a fixing bolt rotatably fitted in the other end, indicated at 3c, of the mounting appliance 3. The tip end of the fixing bolt 6 projects from the device mounting surface 3d of the mounting appliance 3. Numeral 7 denotes a threaded hole formed in the device 1, with the fixing bolt 6 being threadedly fitted therein. Numeral 8 denotes a mounting piece of the mounting appliance 3 for mounting to an automobile or the like with mounting bolts (not shown).

In operation, the hook 5 of the device 1 is fitted on one end 3b of the mounting appliance 3, then the mounting surface 1a of the device 1 is positioned along a device mounting surface 3d of the mounting appliance 3, and the fixing bolt 6 is threadedly engaged with the threaded hole 7 and tightened. The device 1 can therefore be fixed to the mounting appliance 3 in the illustrated state in which the legs 2 are inserted into the rubber seats 4.

In the above conventional device mounting appliance, the fixing bolt 6 must be turned whenever the device 1 is fixed to or removed from the mounting appliance 3. Besides, if the clamping force of the fixing bolt 6 is weak, it is impossible to prevent the device 1 from wobbling in the longitudinal and transverse directions, and the fixing bolt 6 will be loosened when vibrations are applied thereto.

SUMMARY OF THE INVENTION

The present invention has been accomplished for solving the above-mentioned problems and it is the object thereof to provide a device mounting appliance capable of easily fixing a device firmly without wobbling in a fixed state and also capable of removing it easily.

The device mounting appliance according to the present invention comprises a device and a mounting appliance for fixing the device, and it includes at least three combined leg-lugs formed on a mounting surface of the device; recesses formed in the combined leg-lugs, respectively; a fixing lug formed on the mounting surface of the device so as to be positioned within a polygon formed by connecting the combined leg-lugs, the fixing lug being smaller in height than the combined leg-lugs; a removable lever attached to the mounting appliance, the lever having a hook portion and a wobbling preventing projection and being urged in one direction by means of a spring; and guide means provided on the mounting appliance and engaged with lugs of the appliance which are fitted into the aforesaid recesses when the device on the mounting appliance is slid a predetermined distance, and also engaged with the combined leg-lugs upon such slide of the device. When the device on the mounting appliance is slid, the lever is once moved by the fixing lug of the device against the spring and then, at the end of the sliding motion, it is returned by the same spring, allowing the hook portion to grip the fixing lug substantially in the sliding direction, and at the same time the wobbling preventing projection of the lever is brought into pressure contact with the fixing lug.

Thus, in the present invention, when the device is slid with respect to the mounting appliance while the combined leg-lugs of the device are positioned along the guide means of the mounting appliance, the fixing lug of the device causes the lever to move against the spring, and the hook portion of the lever is returned at the end of the sliding motion by the spring comes into engagement with the fixing lug to fix the latter, whereby the device is fixed to the mounting appliance. In this fixed state of the device, not only the recesses of the combined leg-lugs are fitted on the lugs of the mounting appliance and the combined leg-lugs engaged with the guide means, but also the wobbling preventing projection of the lever is brought into pressure contact with the fixing lug, so the device can be fixed firmly without wobbling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a plan view of a conventional device mounting appliance;

FIG. 2 is a front view thereof;

FIG. 3 is a side view thereof;

FIG. 4 is a sectional view taken on line IV—IV of FIG. 1;

DETAILED DESCRIPTION OF THE PREFERRED EMBODIMENTS

Figure 5:
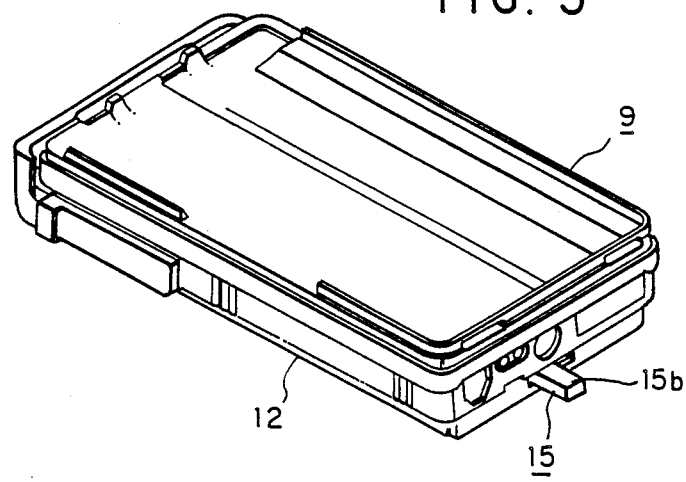
FIG. 5 is a perspective view of a device mounting appliance according to an embodiment of the present invention, as viewed from the device side.
Figure 6:
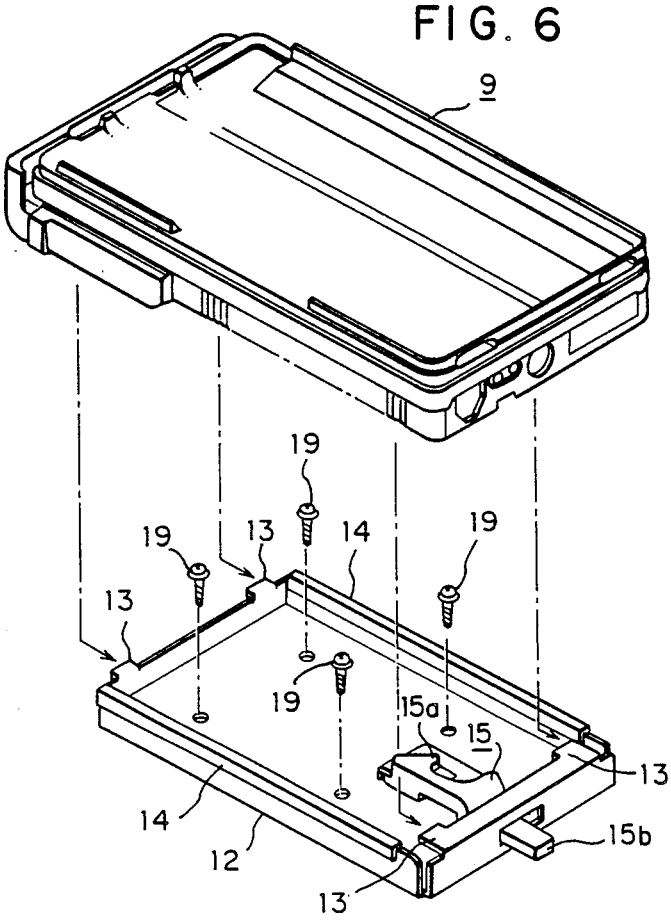
FIG. 6 is a perspective view of the appliance with the device detached from the state shown in FIG. 5.

An embodiment of the present invention will now be described with reference to FIGS. 5 to 17. In the figures, the reference numeral 9 denotes a portable device and the numeral 10 denotes a combined leg and lug formed at least three, say four, on a mounting surface 9a of the device 9 and having a recess 10a for preventing wobbling and drop-out. The recesses 10a of the combined leg-lugs 10 are formed in the same direction. Numeral 11 denotes a fixing lug formed on the mounting surface 9a of the device 9 so as to be positioned within a square area defined by the four combined leg-lugs 10, namely, a polygon defined by joining the leg-lugs, the fixing lug 11 being smaller in height than the combined leg-lugs 10. Numeral 12 denotes a mounting appliance for fixing the device 9 to an automobile or the like, and numeral 13 denotes a lug projecting from the mounting appliance 12, a total of four lugs 13 being provided. The lugs 13 come into engagement with the recesses 10a of the combined leg-lugs 10 to prevent wobbling and drop-out of the device 9. Numeral 14 denotes a guide provided on the mounting appliance 12 and functioning to guide the combined leg-lugs 10 as the device 9 slides. Numeral 15 denotes a lever rotatably supported by the mounting appliance 12. The lever 15 is provided internally with a hook portion 15a and externally with a projecting, manual operating portion 15b. Numeral 16 denotes a spring for urging the lever 15 in one direction; numeral 17 denotes a stopper for the lever 15; and numeral 18 denotes a wobbling preventing projection of the lever 15. The projection 18 is brought into pressure contact with the fixing lug 11. Numeral 19 denotes a mounting bolt for fixing the mounting appliance 12 to an automobile or the like.

The operation of the device mounting appliance will now be described. The device 9 is put on and along the mounting appliance while the combined leg-lugs 10 are fitted in between the guides 14, and in this state illustrated in FIGS. 9 and 10 the device 9 is slid in the direction indicated by an arrow 20. During this sliding motion, the fixing lug 11 comes into abutment with the lever 15 and causes the lever 15 to turn clockwise against the spring 16. At the end of the sliding motion, the fixing lug 11 is disengaged from the hook portion 15a of the lever 15, whereupon the lever 15 returns by virtue of the spring 16 and the hook portion 15a comes into engagement with the fixing lug 11. Thus, in the state of FIGS. 7 and 8, upon engagement of the hooking portion 15a of the lever 15 with the fixing lug 11, the lugs 13 fit into the recesses 10a of the combined leg-lugs 10 and at the same time the leg-lugs 10 engage the guides 14 and the wobbling preventing projection 18 of the lever 15 lifts the fixing lug 11 to eliminate vertical, transverse and longitudinal wobbling motions of the device 9. In this way the device 9 is fixed to the mounting appliance 12.

Figure 7:
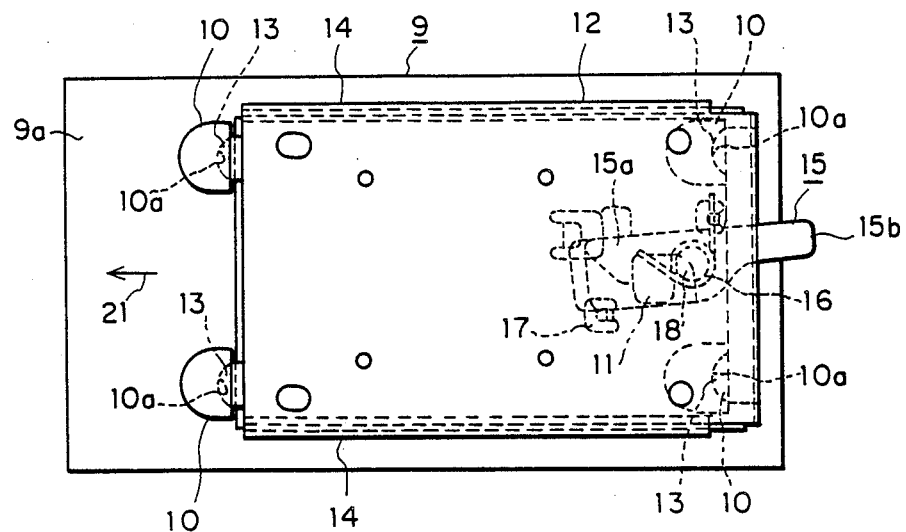
FIG. 7 is a rear view as seen from the mounting appliance side.
Figure 8:
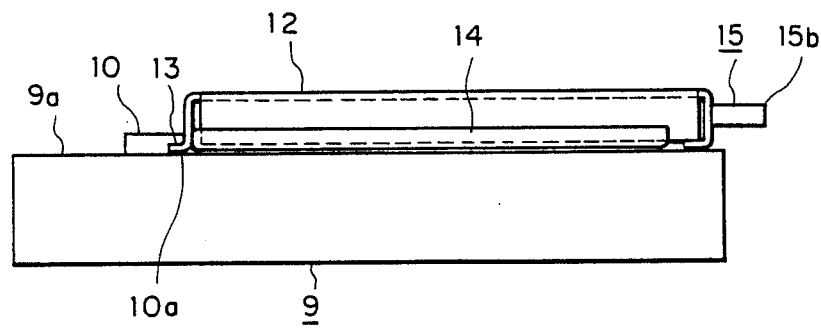
FIG. 8 is a side view of FIG. 7.
Figure 9:
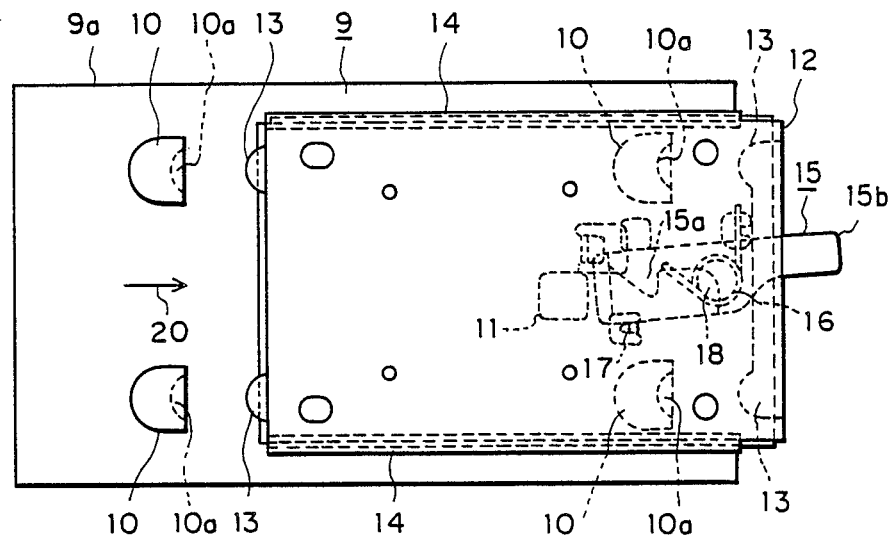
FIG. 9 is a view similar to FIG. 7, showing a sliding motion of the device.
Figure 10:
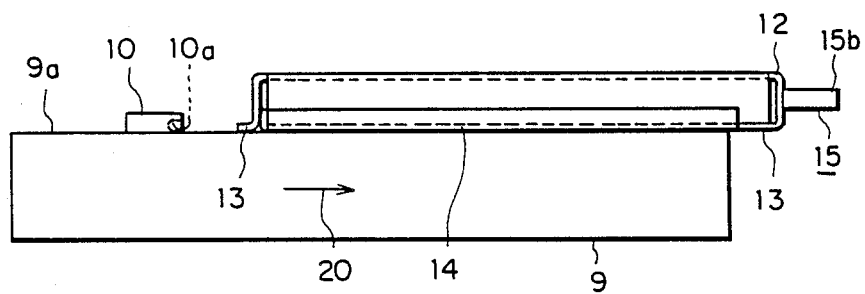
FIG. 10 is a side view of FIG. 9.
Figure 11:
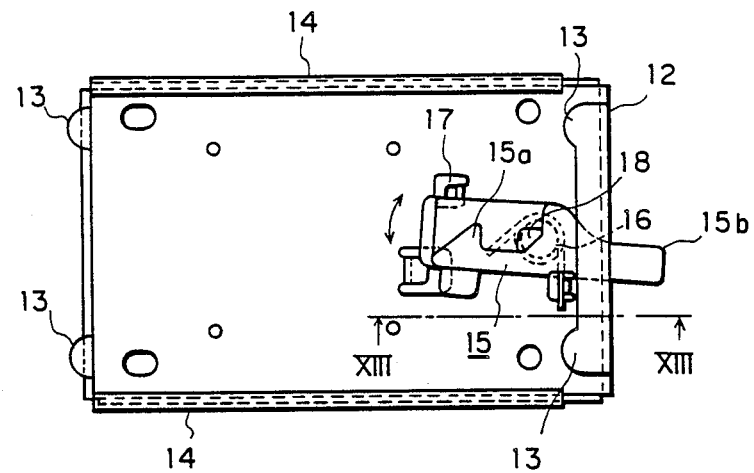
FIG. 11 is a surface view of the mounting appliance.
Figure 12:
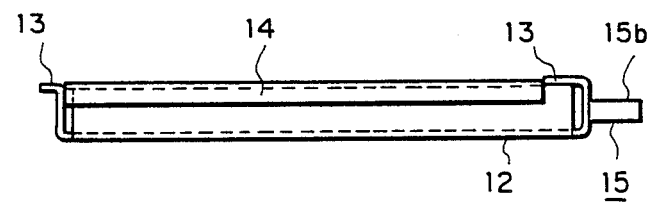
FIG. 12 is a side view of FIG. 11.
Figure 13:
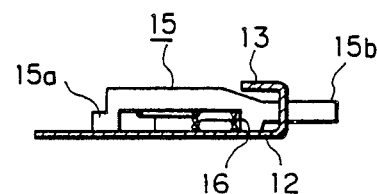
FIG. 13 is a sectional view taken on line XIII—XIII of FIG. 11.
Figure 14:
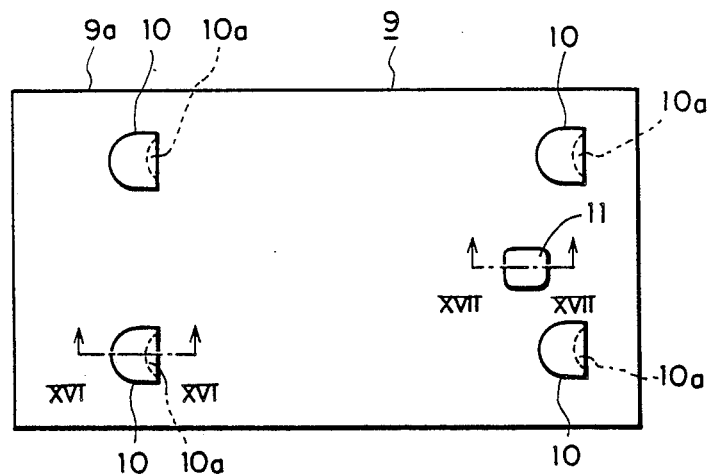
FIG. 14 is a rear view of the device.
Figure 15:
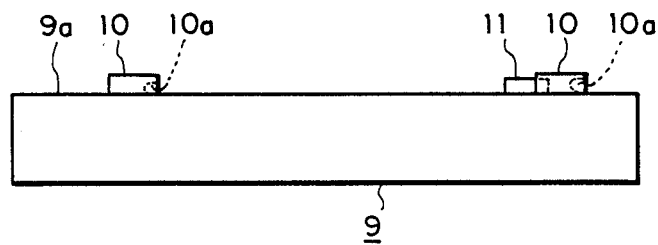
FIG. 15 is a side view of FIG. 14.
Figure 16:
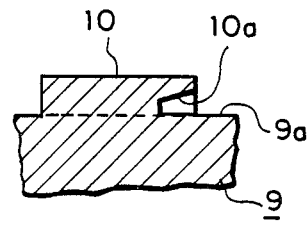
FIG. 16 is an enlarged sectional view taken on line XVI—XVI of FIG. 14.
Figure 17:
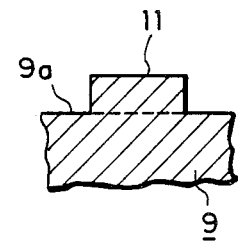
FIG. 17 is an enlarged sectional view taken on line XVII—XVII of FIG. 14.

For removing the device 9 from its fixed state shown in FIG. 7, the manual operating portion 15b of the lever 15 is turned clockwise against the spring 16 to disengage the hook portion 15a of the lever 15 from the fixing lug 11, so that the device slides in the direction of arrow 21 and thus can be removed easily.

Figure 18:
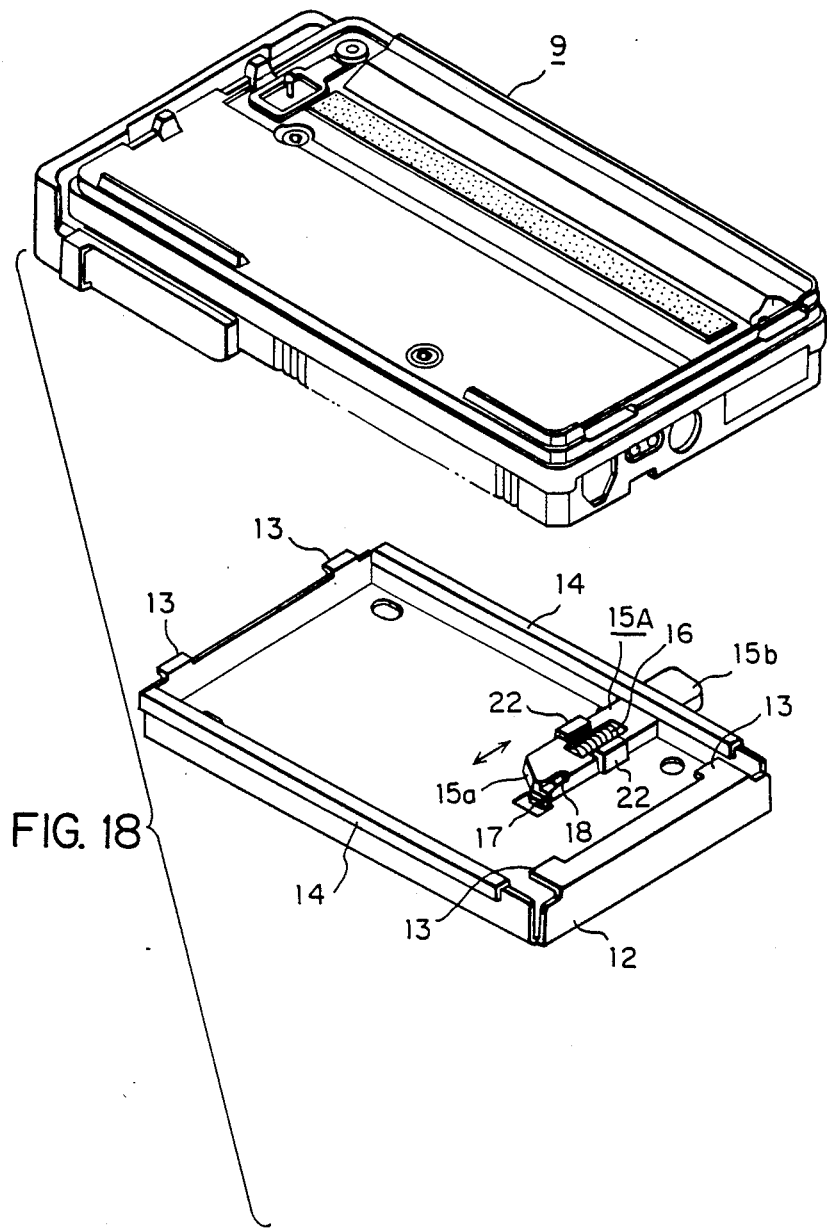
FIG. 18 is a view similar to FIG. 6, showing another embodiment of the present invention.

Although the lever 15 used in the above embodiment is a turning type lever, it may be replaced by a reciprocating type lever 15A as shown in FIG. 18. The lever 15A can be moved through guide pieces 22, thereby permitting the manual operating portion 15b to be pulled outwards against the spring 16.

In accordance with the present invention described above, the device mounting appliance can easily mount and detach the device, and the device can be fixed firmly to the mounting appliance without wobbling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device mounting appliance comprising a device and a mounting appliance, said device mounting appliance including:
    at least three combined leg-lugs formed on a mounting surface of the device;
    recesses formed in said combined leg-lugs, respectively;
    a fixing lug formed on the mounting surface of the device so as to be positioned within a polygon formed by connecting the combined leg-lugs;
    a movable lever attached to the mounting appliance, said lever having a hook portion and a wobbling preventing projection;
    a spring for urging the lever in one direction; and
    guide means provided on the mounting appliance and engaged with lugs of the appliance which are fitted into the recesses of said combined leg-lugs when the device on the mounting appliance is slid a predetermined distance, and also engaged with the combined leg-lugs upon sliding of the device
    wherein when the device on the mounting appliance is slid, said lever is moved once by said fixing lug of the device against said spring and then, at the end of the sliding motion, the lever is returned by the spring, allowing said hook portion to grip the fixing lug substantially in the sliding direction, and at the same time said wobbling preventing projection of the lever is brought into pressure contact with the fixing lug.

2. The device mounting appliance according to claim 1, wherein said lever is rotatably attached to said mounting appliance.

3. The device mounting appliance according to claim 1, wherein said lever is attached to said mounting appliance for reciprocation in predetermined directions.

4. The device mounting appliance according to claim 1, wherein four combined leg-lugs are provided on said mounting surface of the device, and four lugs of the mounting appliance are also provided correspondingly to the number of said combined leg-lugs.

* * * * *